United States Patent
Obstfeld et al.

(10) Patent No.: US 12,406,083 B2
(45) Date of Patent: Sep. 2, 2025

(54) DATA OBFUSCATION AND PROTECTION IN A Web3 ENVIRONMENT

(71) Applicant: Cisco Technology, Inc., San Jose, CA (US)

(72) Inventors: Joel A. Obstfeld, Bushey (GB); Oliver James Bull, Bristol (GB); Louis Gwyn Samuel, Swindon (GB); Andrew Pletcher, Scotts Valley, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 234 days.

(21) Appl. No.: 18/360,254

(22) Filed: Jul. 27, 2023

(65) Prior Publication Data

US 2025/0036793 A1    Jan. 30, 2025

(51) Int. Cl.
  *G06F 21/00* (2013.01)
  *G06F 21/62* (2013.01)
  *H04L 9/00* (2022.01)
  *H04L 9/40* (2022.01)

(52) U.S. Cl.
  CPC ............ *G06F 21/6227* (2013.01); *H04L 9/50* (2022.05); *H04L 63/0428* (2013.01)

(58) Field of Classification Search
  None
  See application file for complete search history.

(56) References Cited

U.S. PATENT DOCUMENTS

| | | | |
|---|---|---|---|
| 2016/0149769 A1 | 5/2016 | Joshi et al. | |
| 2018/0130050 A1 | 5/2018 | Taylor et al. | |
| 2019/0342084 A1 | 11/2019 | Mehedy et al. | |
| 2020/0151708 A1* | 5/2020 | Sui | H04L 9/0637 |
| 2020/0211011 A1 | 7/2020 | Anderson | |
| 2020/0344043 A1* | 10/2020 | Komarov | H04L 9/0637 |
| 2021/0194700 A1 | 6/2021 | Moy et al. | |
| 2021/0312088 A1* | 10/2021 | Choi | H04L 63/123 |
| 2022/0217113 A1 | 7/2022 | Khan et al. | |

OTHER PUBLICATIONS

Middleware, "Web3 observability: How to monitor Web3 applications," https://middleware.io/blog/web3-observability/, Dec. 6, 2022, 22 pages.

(Continued)

*Primary Examiner* — Andrew J Steinle
(74) *Attorney, Agent, or Firm* — Edell, Shapiro & Finnan, LLC

(57) ABSTRACT

A method, computer system, and computer program product are provided for obfuscating and storing data. A data object is obtained comprising data for storing to a plurality of distributed ledgers. Sequence information is obtained indicating a number of a plurality of data portions into which the data object is divided, and instructions for storing the plurality of data portions to the plurality of distributed ledgers. The plurality of data portions is generated by dividing the data object according to the number. The plurality of distributed ledgers are determined to store the plurality of data portions based on the instructions indicated by the sequence information. The plurality of data portions is stored across the plurality of distributed ledgers by accessing the plurality of distributed ledgers, wherein each data portion is stored to a particular distributed ledger of the plurality of distributed ledgers according to the instructions indicated by the sequence information.

20 Claims, 7 Drawing Sheets

(56) References Cited

OTHER PUBLICATIONS

Mcbride, M., et al., "BGP Blockchain," Workgroup: Network Working Group, Internet-Draft: draft-mcbride-rtgwg-bgp-blockchain-02, https://datatracker.ietf.org/doc/draft-mcbride-rtgwg-bgp-blockchain/, Mar. 6, 2023, 13 pages.
Connext Labs, "Welcome to the Connext Docs," https://docs.connext.network/, May 5, 2023, 3 pages.
Layer Zero, "Seamlessly Connected Blockchains," retrieved from https://layerzero.network, May 5, 2023, 4 pages.
Trossen, D., et al., Industry IoT Consortium, "Impact of Distributed Ledgers on Provider Networks," An Industry IoT Consortium Whitepaper, iiconsortium.org, Jan. 10, 2022, 20 pages.
Preethi Kasireddy, "The Architecture of a Web 3.0 application," https://www.preethikasireddy.com/post/the-architecture-of-a-web-3-0-application, Sep. 22, 2021, 31 pages.
Cloudflare, "Your Gateway To Web3," Easy access to IPFS and Ethereum networks, retrieved from https://www.cloudflare.com/application-services/products/web3/ on Jul. 26, 2023, 9 pages.
Metamask, "A crypto wallet & gateway to blockchainapps," retrieved from https://metamask.io/, on Jul. 26, 2023, 10 pages.
Tenderly, "Enabling Web3 developers to build, test, monitor, and operate smart contracts from their inception to mass adoption.," Ethereum Development Platform, retrieved from https://tenderly.co/, Jul. 26, 2023, 11 pages.
Settlemint, "Blockchain Made Easy.," retrieved from https://www.settlemint.com/, on Jul. 26, 2023, 26 pages.
Kaleido, "Your Web3 Platform for Blockchain & Digital Assets," Enterprise-Grade Blockchain & Digital Asset Platform, retrieved from https://www.kaleido.io/, on Jul. 26, 2023, 9 pages.
Wang, Q., et al., "Exploring Web3 From the View of Blockchain," (Tech Report), https://www.researchgate.net/publication/361416088_Exploring_Web3_From_the_View_of_Blockchain, Jun. 17, 2022, 38 pages.

* cited by examiner

DATA OBFUSCATION AND PROTECTION IN A Web3 ENVIRONMENT

TECHNICAL FIELD

The present disclosure relates generally to data security, and more specifically, to obfuscating and protecting data that is stored in a Web3 environment.

BACKGROUND

Web3 is an idea for a new iteration of the World Wide Web which incorporates concepts such as decentralization, blockchain technologies, and token-based economics. In contrast to previous paradigms (e.g., Web 2.0), data and content are decentralized rather than stored in centralized databases or provided by centralized servers. Web3 technologies may include decentralized ledgers, smart contracts, decentralized storage solutions, and the like. However, as user data is typically distributed across multiple physical computing devices, data security is a concern.

DETAILED DESCRIPTION

Overview

Figure 1:
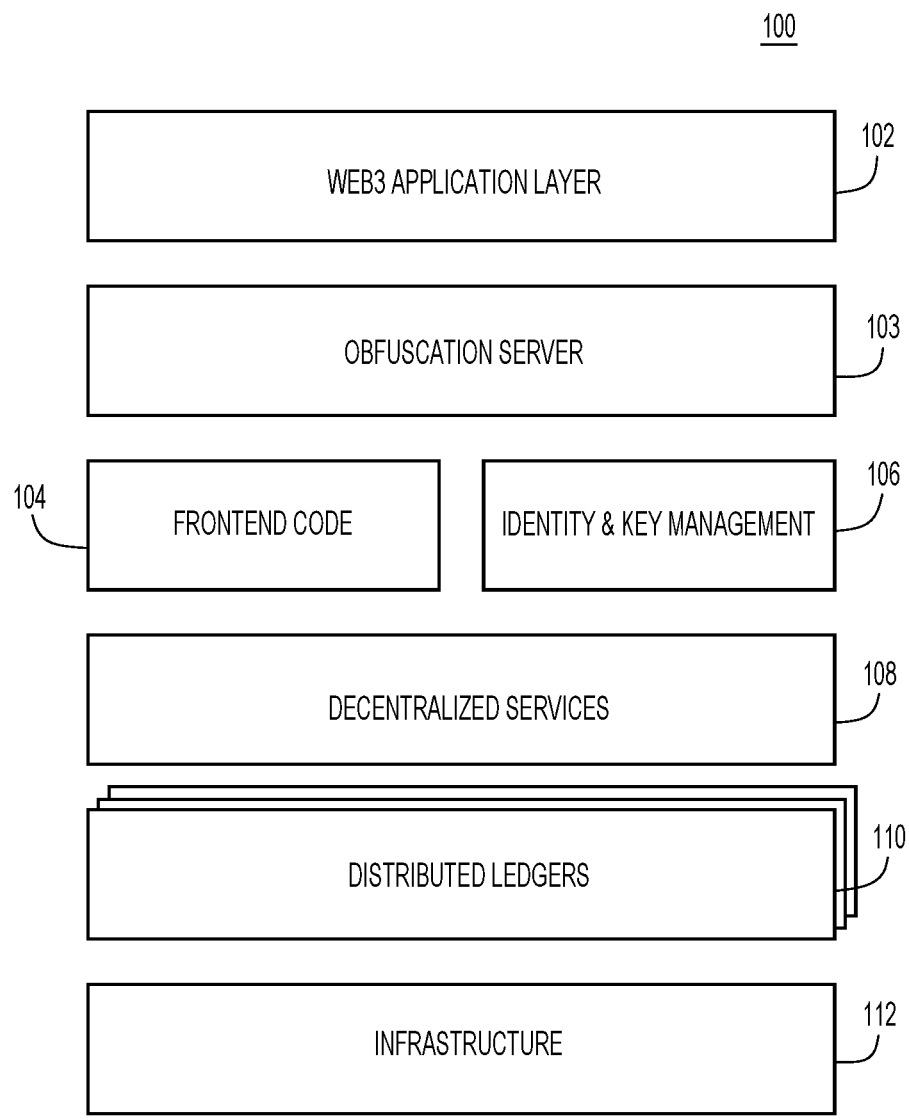
FIG. 1 is a block diagram of a conceptual model for utilizing, supporting, and/or providing Web3 services, according to an example embodiment.

According to one embodiment, techniques are provided for obfuscating and protecting data. A data object is obtained comprising data for storing to a plurality of distributed ledgers. Sequence information is obtained indicating a number of a plurality of data portions into which the data object is divided, and instructions for storing the plurality of data portions to the plurality of distributed ledgers. The plurality of data portions is generated based on dividing the data object according to the number. The plurality of distributed ledgers are determined to store the plurality of data portions based on the instructions indicated by the sequence information. The plurality of data portions is stored across the plurality of distributed ledgers by accessing the plurality of distributed ledgers, wherein each data portion is stored to a particular distributed ledger of the plurality of distributed ledgers according to the instructions indicated by the sequence information.

Example Embodiments

Present embodiments relate data security, and more specifically, to obfuscating and protecting data that is stored in a Web3 environment. Information that is written to distributed ledgers can be readily accessed by third parties using tools such as block explorers. Both private and public distributed ledgers therefore present risks of data exposure. For example, private distributed ledgers can be vulnerable to user error or intentional data exfiltration if a trusted user's credentials are exposed. Data placed on public distributed ledgers can be examined by the public, therefore even more care is to be taken if such a facility is used.

To address this problem, the embodiments presented herein provide an improved approach to storing data across distributed ledgers in a manner that obfuscates and secures the data. In particular, multiple different distributed ledgers are utilized to store data in a secured fashion: a data object is divided into smaller sub-units, and the sub-units are stored to various distributed ledgers according to a particular sequence such that the data can only be reassembled into a form that can be then be utilized with knowledge of the sequence. The sequence may be kept confidential, similarly to an encryption key, so that only a user with the sequence can retrieve the data sub-units and restore the original data object.

Thus, present embodiments improve the technical fields of cybersecurity and data storage by providing a secure mechanism that obfuscates data that is stored to distributed Web3 platforms. In particular, a data object can only be obtained with knowledge of where each data sub-unit is stored, including the particular distributed ledger and the location on that ledger; furthermore, the data object can only be recovered with knowledge of the order in which to reassemble the sub-units. Thus, present embodiments provide the practical application of storing data in a novel manner that employs "chain-hopping" techniques in which data is split up and distributed across multiple distributed ledgers (e.g., blockchains).

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

The term "Web3" denotes a collection of technologies and network models that collectively provide a decentralized approach in contrast to the prevailing centralized model of systems and solutions. In a centralized model, services are provided at the discretion of a single administrative entity. Conversely, in a decentralized model, services are delivered through the collaborative efforts of various administrative entities without a singular point of ownership or control. The primary objective of Web3 is to facilitate the creation of services composed of logical infrastructure offered by diverse administrative entities.

In such an environment, a set of technologies is necessary to establish trust and assurance concerning the operation and execution of services. This entails fostering trust and assurance among administrative entities offering logical infrastructure, as well as ensuring trust and assurance for the users of the resulting services. This set of technologies may encompass distributed ledgers, consensus mechanisms, payment methods for service exchanges, decentralized protocols, and smart contracts. These technologies work in tandem to enable the development of applications and services.

In a Web3 paradigm, distributed ledger technology (DLT) may be employed to provide various services. DLT may be an append-only distributed data structure that includes authenticity and integrity features in which updates (inserts) must be accepted via a consensus mechanism among validators. Validators may refer to blockchain contribution operators that run a block consensus protocol. Blockchains refer to a type of DLT wherein the underlying data structure includes a hash chain of blocks of data. Contribution nodes are a component of a distributed ledger that provide compute, storage, and/or bandwidth services for running a DLT, blockchain, or other decentralized service. In DLT, contribution tokens may be a unit of value bound to the action of contributing to a peer-to-peer network running the DLT or blockchain; value tokens may store value and can be traded as assets. In the context of Web3, a smart contract may include a computer program that is configured to automatically execute, control, or document relevant events and actions according to the terms of a contract or agreement. A DLT may implement smart contracts by including a state machine that can be updated via DLT updates. A DLT may interface with one or more oracles, which are independent entities that provide information into and/or out of the smart contracts; oracles may also validate state and results. A distributed application (dApp) may run on a blockchain, using a DLT to store state, and can utilize smart contract technology. Thus, a dApp is distributed in the sense that a dApp does not use a single central server as a service core.

Embodiments will now be described in detail with reference to the Figures. Reference is now made to FIG. 1. FIG. 1 is a block diagram of a Web3 model 100 for utilizing, supporting, and/or providing Web3 services, according to an example embodiment.

Web3 model 100 has various layers, including a Web3 application layer 102, an obfuscation server 103, a frontend code layer 104, an identity and key management layer 106, a decentralized services layer 108, a distributed ledger layer 110 (including one or more distributed ledgers), and an infrastructure layer 112. It should be appreciated that these layers are examples that are provided for the sake of clarity, and may not indicate any particular network topology.

Web3 application layer 102 may include one or more Web3 services that provide utility to end-users. These Web3 services may encompass a wide range of user experiences, use cases, and applications that leverage the benefits of decentralized technologies, and may not be limited to strictly Web3 environments. Some of the prominent use cases and applications may include single or multi-player games, virtual meeting environments, online collaboration tools, social media platforms, collectibles, augmented reality applications, virtual reality applications, cryptocurrency platforms, and the like. It is important to note that while these experiences and use cases can be facilitated by Web3 technologies, they are not exclusively dependent on Web3 and can be implemented in other contexts as well.

Obfuscation server 103 may perform operations in accordance with present embodiments that relate to the obfuscation, storage, and/or retrieval of data to/from distributed ledgers (e.g., distributed ledgers of distributed ledger layer 110). Obfuscation server 103 is depicted and described in further detail with reference to FIG. 3.

Frontend code layer 104 for Web3 applications may refer to the application code that runs on client devices, enabling the user interface and interaction with decentralized services. This code can use various languages, such as JavaScript®, Hypertext Markup Language (HTML), and/or Cascading Style Sheets (CSS). Frontend code layer 104 can provide the necessary functionality to interact with decentralized networks, access smart contracts, and handle user interactions. Frontend code layer 104 may include frameworks and libraries that can be utilized to build scalable and modular Web3 front-end applications (e.g., Web3 applications of Web3 application layer 102). In some embodiments, frontend code layer 104 provides the structure and content of Web pages, such as user interface elements, including text, buttons, forms, and containers. Frontend code layer 104 can be configured to provide any desired colors, fonts, layouts, and/or other visual properties of a user interface. Thus, frontend code layer 104 may enable the creation of dynamic and interactive user interfaces, facilitating the integration of decentralized functionality, and providing the particular user experience when interacting with Web3 services on client devices.

Identity and key management layer 106 provides an infrastructure for managing user identities, cryptographic keys, accounts, certificates, and signing operations within decentralized applications. Identity and key management layer 106 may ensure secure and reliable authentication, authorization, and cryptographic operations. In some embodiments, identity and key management layer 106 manages wallets, which are software applications that enable users to securely store and manage their cryptographic keys. These wallets typically employ strong encryption techniques to safeguard private keys and provide convenient interfaces for users to interact with their accounts and assets on decentralized networks. Identity and key management layer 106 may manage cryptographic keys, which are used for various purposes, including identity verification, digital signatures, encryption, and/or access control. Web3 identity systems often utilize public-key cryptography, where users possess a private key for signing transactions or providing proof of identity, and a corresponding public key for verification purposes. In some embodiments, identity and key management layer 106 manages Web3 accounts that are associated with specific identities or entities on decentralized networks. The accounts can be linked to cryptographic key pairs and may serve as the primary mechanism of interaction and ownership within the Web3 ecosystem. Accounts enable users to access and manage their assets, interact with smart contracts, and participate in network activities. Identity and key management layer 106 may manage certificates for enhancing trust and security. Certificates can serve as digital credentials that bind a user's identity to their cryptographic keys, enabling verification and validation of identities in decentralized environments. Certificates can be issued by trusted authorities or implemented through decentralized identity frameworks. In some embodiments, identity and key management layer 106 performs signing operations, which may involve using cryptographic keys to generate digital signatures. In Web3 environments, signing is used to ensure data integrity, non-repudiation, and/or secure transactions. By signing messages or transactions with their private keys, users can prove ownership and provide cryptographic proof of authenticity and integrity.

Decentralized services layer 108 includes multiple disparate entities collaborating to offer various services. These services may include distributed document storage, tokenization, proof-of-existence, distributed computation-as-a-service, distributed communications-as-a-service, distributed ledger indexing and querying, and/or payment and exchange of value. Distributed document storage enables decentralized storage of files across a network of nodes, ensuring data availability and resilience. Tokenization represents real-world assets or rights as digital tokens, enabling fractional ownership and transferability. Proof-of-existence allows users to prove the integrity and timestamped existence of digital assets. Distributed computation-as-a-service may employ collective computational power for complex tasks, whereas distributed communications-as-a-service may facilitate secure and private communication without centralized intermediaries. Distributed ledger indexing and querying can provide access to data on distributed ledgers. Payment and exchange systems enable decentralized transactions using blockchain technology.

Distributed ledger layer 110 may employ one or more distributed ledgers that include various components and mechanisms to establish trust and assurance between entities in a decentralized environment. In one embodiment, distributed ledger layer 110 includes at least three distinct distributed ledgers, each of which may be based on a same or different combination of protocols, computing devices, and/or other technologies, etc. Distributed ledger layer 110 may include distributed ledger technologies, consensus mechanisms, layer 1 and layer 2 ledgers, rollups, zero-knowledge proofs, sharding, smart contract code, smart contract execution engines, contribution nodes, validator nodes, peer-to-peer (P2P) communications protocols, contribution tokens, and oracles. Distributed ledger technologies enable the decentralized storage and management of data across a network of nodes, and consensus mechanisms ensure agreement on the state of the ledger among participating nodes. Layer 1 features utilize methods such as changing the consensus mechanism, forking the chain, and sharding. In contrast, layer 2 services include state channels, nested blockchains, rollups, and sidechains. Rollups may aggregate and process transactions off-chain before committing the transactions to the main chain. Zero-knowledge proofs enable privacy-preserving and verifiable computations. Sharding elements partition the network into smaller groups, enhancing scalability. Smart contract code represents self-executing agreements on the ledger, while smart contract execution engines handle the processing and validation of these contracts. Distributed ledger layer 110 may include contribution nodes and validator nodes that maintain and secure the network. In some embodiments, peer to peer (P2P) communications protocols facilitate decentralized communication between nodes. Distributed ledger layer 110 utilizes contribution tokens to incentivize participation and contribution within the network. In some embodiments, distributed ledger layer 110 includes one or more oracles to provide external data and real-world information to smart contracts or other distributed applications.

Infrastructure layer 112 may include a set of components that form the hardware and/or software that supports decentralized services and models, which may be substantially similar to those found in centralized systems. Infrastructure layer 112 can include compute resources, network infrastructure, telecommunications capabilities, bandwidth availability, processing capacity, hosting services, access mechanisms, security measures, and software frameworks. Compute resources may include the hardware and software used for data processing and storage such as processor(s), microprocessor(s) and memory. Network infrastructure enables the connectivity and communication between nodes in the decentralized network, and other telecommunication elements may be responsible for the exchange of data and information across different network endpoints. Hosting services can support the deployment and management of decentralized applications and services. Access mechanisms may be provided to enable users to interact with the decentralized infrastructure of various components of Web3 model 100 and its various services. Security measures may be provided to protect data, privacy, and network integrity. Software frameworks may provide the tools and libraries for developing and running Web3 applications in Web3 application layer 102.

Figure 2:
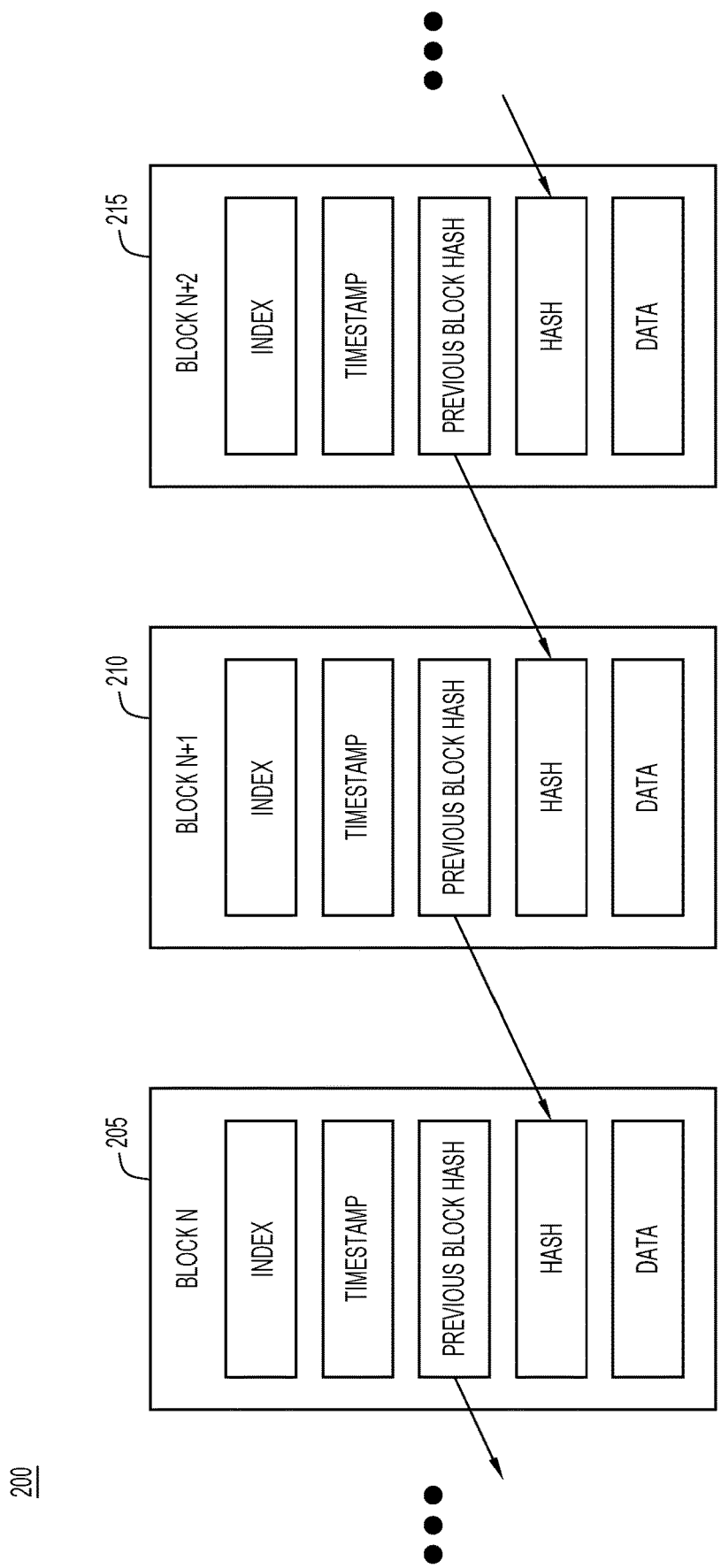
FIG. 2 is a block diagram depicting a distributed ledger for performing or supporting various operations in accordance with an embodiment of the present invention.

With reference now to FIG. 2, a block diagram is provided depicting a distributed ledger 200 for performing or supporting various operations in accordance with an embodiment of the present invention. As depicted, there are three blocks, block N (205), block N+1 (210), and block N+2 (215). It should be appreciated that this depiction of a distributed ledger 200 is only a portion of the ledger, and information can be stored as an entry in any block in distributed ledger 200. In some embodiments, distributed ledger 200 is a blockchain. Distributed ledger 200 may correspond to elements that are depicted and described with reference to distributed ledger layer 110 of FIG. 1.

Each block 205-215 may include an index, a timestamp, a previous block hash, a hash, and data. The index of a block includes an identifier for the block (e.g., a block ID), such as a unique key. The timestamp of a block may indicate when the block was created, validated, and/or last modified. The previous block hash contains a hash of information in the previous block, which in turn capture, via their own hash, information in the next preceding block, ensuring that data recorded in distributed ledger 200 is immutable. In some embodiments, each hash may be a cryptographic hash, and may include a hash of the data stored in its block as well as the data corresponding to the previous block's hash. Thus, once recorded, the data in any given block cannot be altered retroactively without alteration of all subsequent blocks, which involves consensus of the network majority. The data can include any desired data, such as a transaction record, video data, text data, audio data, time-series data, encrypted data, data and corresponding metadata, and the like.

Figure 3:
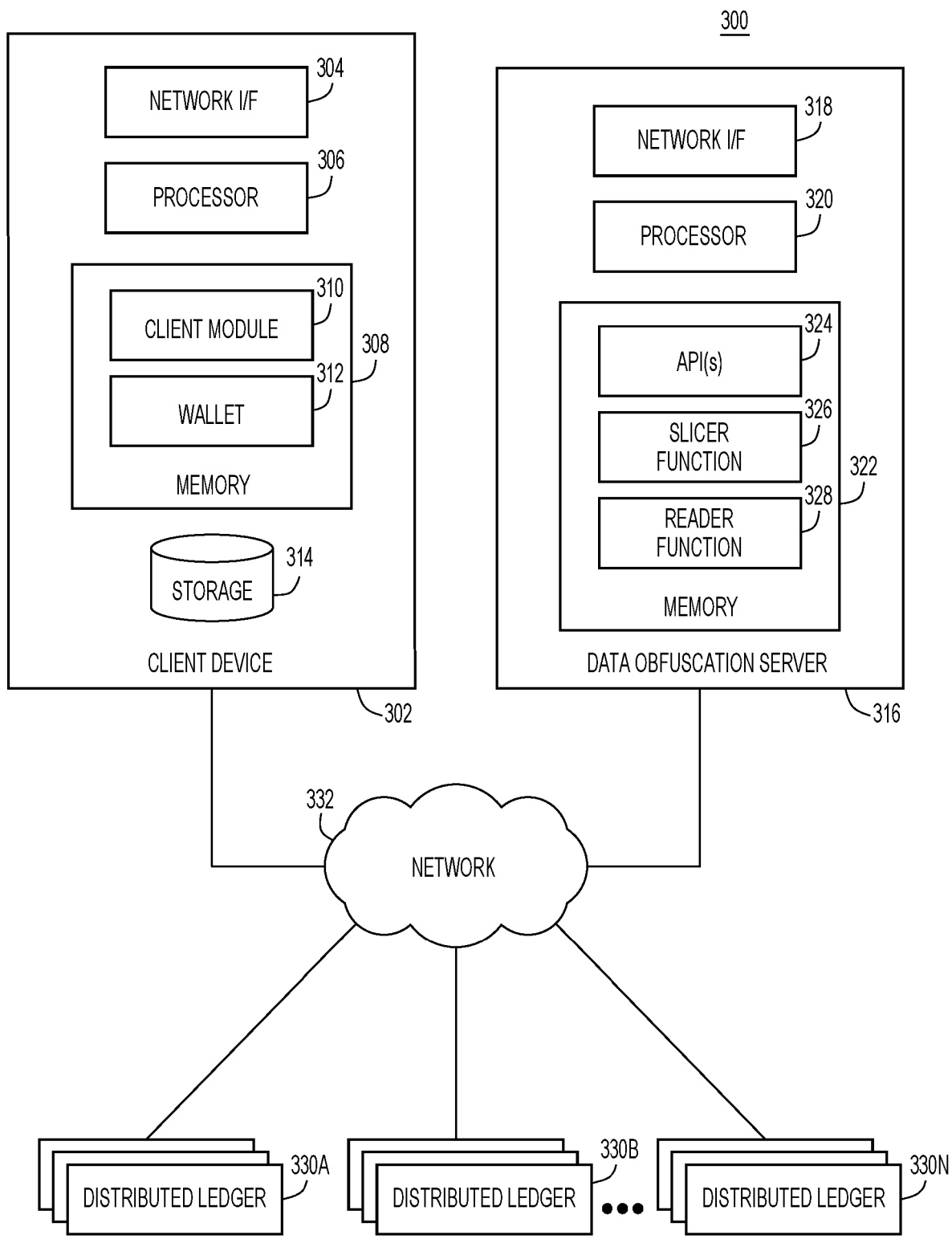
FIG. 3 is a block diagram of a computing environment for obfuscating and protecting data using Web3 services, according to an example embodiment.

FIG. 3 is a block diagram in which a computing environment 300 is shown for obfuscating and protecting data using Web3 services, according to an example embodiment. As depicted, computing environment 300 includes a client device 302, a data obfuscation server 316, and a plurality of distributed legers 330A, 330B, . . . 330N that are in communication via a network 332. It is to be understood that the functional division among components have been chosen for purposes of explaining various embodiments and is not to be construed as a limiting example.

Client device 302 includes a network interface (I/F) 104, at least one processor (computer processor) 106, memory 308 (which stores instructions for a client module 310 and a wallet 312), and storage 314. In various embodiments, client device 302 may include a rack-mounted server, laptop, desktop, smartphone, tablet, or any other programmable electronic device capable of executing computer readable program instructions. Network interface 304 enables components of client device 302 to send and receive data over a network, such as network 332. It should be appreciated that there may be multiple client devices 302 as part of the computing environment 300; however, for simplicity, a single client device 302 is shown in the example embodiment of FIG. 1.

Client module 310 and/or wallet 312 may include one or more modules or units to perform various functions of the embodiments described below. Client module 310 and/or wallet 312 may be implemented by any combination of any quantity of software and/or hardware modules or units, and may reside within memory 308 of client device 302 for execution by a processor, such as processor 306.

Client module 310 may include any application that enables a user to place requests for storing and/or receiving data, which is stored in accordance with present embodiments. In particular, a user of client device 302 may utilize client module 310 to obtain data objects, provide data objects to data obfuscation server 316 in a request for storage, and/or place requests to data obfuscation server 316 to retrieve stored data objects. The data objects that are processed by client module 310 may include any data arranged in any format, including data files, unorganized data, time-series data, and the like. Thus, the data objects may include media (e.g., image data, video data, and/or audio data, etc.), text, and the like. Additionally or alternatively, client module 310 may enable users to manage their digital identities, interact with decentralized applications (e.g., using a wallet such as wallet 312), and/or otherwise manage digital assets. Thus, client module 310 can provide Web3 service integration by supporting connectivity to Web3 services (e.g., distributed ledgers 330A-330N) either directly or via data obfuscation server 316.

Client module 310 may include a wallet management system to manage one or more wallets, such as wallet 312. Using client module 310, users can create and import wallets, store sequence information (which is used to store and/or retrieve data objects, and is discussed in further detail with reference to FIG. 4), private keys, and/or seed phrases, and interact with distributed ledger networks to send and receive digital tokens, including non-fungible tokens, fungible tokens, and the like. Wallet 312 may include a software application or tool that enables a user to securely store, manage, and interact with their digital assets and/or other data, including tokens and other digital representations of value (e.g., compute tokens for offloading computing jobs to decentralized or cloud-based computing resources). Wallet 312 may employ cryptographic techniques to securely store private keys or seed phrases, which are used to access and control the user's digital assets (e.g., via client module 310). In some embodiments, wallet 312 may digitally sign transactions using a user's private key; the signed transactions can be broadcasted to a distributed ledger, enabling users to engage with decentralized services (e.g., executing smart contracts, etc.). Wallet 312 may include one or more addresses for receiving data, and/or wallet 312 may include one or more addresses corresponding to a unique identity of a user.

Storage 314 may include any non-volatile storage media known in the art. For example, storage 314 can be implemented with a tape library, optical library, one or more independent hard disk drives, or multiple hard disk drives in a redundant array of independent disks (RAID). Similarly, data on storage 314 may conform to any suitable storage architecture known in the art, such as a file, a relational database, an object-oriented database, and/or one or more tables. Storage 314 may store data objects that are provided to and/or obtained from distributed ledgers 330A-330N in accordance with present embodiments. Additionally or alternatively, storage 314 may store sequence information that is used to store and/or retrieve data objects stored to distributed ledgers 330A-330N.

Data obfuscation server 316 includes a network interface (I/F) 318, at least one processor 320, and memory 322, which stores instructions for one or more application programming interfaces (APIs) 324, a slicer function 326, and a reader function 328. In various embodiments, data obfuscation server 316 may include a rack-mounted server, laptop, desktop, smartphone, tablet, or any other programmable electronic device capable of executing computer readable program instructions. Network interface 318 enables components of data obfuscation server 316 to send and receive data over a network, such as network 332. In general, data obfuscation server 316 handles requests from remote computing devices (e.g., client device 302) to utilize Web3 or other services (e.g., distributed ledgers 330A-330N) for storage and/or retrieval of data.

API(s) 324, slicer function 326, and/or reader function 328 may include one or more modules or units to perform various functions of the embodiments described below. API(s) 324, slicer function 326, and/or reader function 328 may be implemented by any combination of any quantity of software and/or hardware modules or units, and may reside within memory 322 of data obfuscation server 316 for execution by a processor, such as processor 320.

Data obfuscation server 316 may expose one or more APIs (e.g., API(s) 324) that handle requests on behalf of clients (e.g., client device 302) to send requests and/or receive responses. These APIs 324 can utilize standard communication protocols, such as HTTP (Hypertext Transfer Protocol), WebSocket, or other appropriate protocols, to facilitate the transmission of data between client device 302, data obfuscation server 316, and distributed ledgers 330A-330N. Client applications (e.g., client module 310) may initiate requests by sending messages to data obfuscation server 316 using one or more APIs 324. These requests may include operations like providing data objects, submitting requests to store data objects, and/or obtaining data objects that are stored across distributed ledgers 330A-330N.

Slicer function 326 may include logic for performing operations relating to the dividing of data objects into data portions and subsequent storage of data portions. Slicer function 326 may receive a data object from client device 302, which can be divided and stored according to sequence information that comprises instructions for dividing and/or storing a data object. The sequence information may be a string or other data, and includes a listing of distributed ledgers to which each data portion of a data object should be stored. The length of the sequence information can indicate the number of data portions into which a data object is divided, and the content of the sequence information can identify the specific distributed ledger for storing each data portion. For example, if the sequence information recites "ABCAB" (n.b.: this is a practical example, as the sequence information may be a binary string or other data format), the sequence information may indicate that a data object is to be divided into five data portions, and the first data portion should be stored to distributed ledger "A", the second to distributed ledger "B", the third to distributed ledger "C", the fourth to distributed ledger "A", and the fifth to distributed ledger "B". Thus, sequence information can both identify how slicer function 326 should divide a data object as well as indicate where each resulting data portion should be stored.

When processing a data object and sequence information, slicer function 326 may evenly divide the data object into data portions that are a same data size or substantially a same data size. If a data object cannot be evenly divided into a number of data portions, then one or more of the data portions may be larger or smaller than the other data portions. For example, if a data object is 38 bytes and is to be divided into six data portions, the resulting output may include five data portions that are six bytes, and a sixth data portion that is eight bytes. The sequence information may be associated with a record of the data object so that the data object can be subsequently retrieved, and this association may be stored by data obfuscation server 316 and/or provided to client device 302. The sequence information may be predefined, generated by a random number generator or pseudo-random number generator, or can be generated using other techniques. The sequence information may be rotated after a predetermined number of uses or after a predetermined amount of time so that new sequence information is utilized for different data objects. In some embodiments, the sequence information is unique for each data object processed by slicer function 326. In various embodiments, the sequence information may be generated by client device 302 and shared to data obfuscation server 316, or the sequence information may be generated by data obfuscation server 316.

Once a data object is processed into data portions, slicer function 326 may access the distributed ledger to which each data portion is assigned to cause that data portion to be stored to the corresponding distributed ledger (as indicated by the sequence information). Slicer function 326 may access distributed ledgers 330A-330N via API(s) 324. Slicer function 326 may receive, from each distributed ledger, confirmation that a data portion has been stored, as well as a block ID for the block or blocks to which the data portion has been stored. Depending on the size of blocks in a particular distributed ledger and the size of each data portion, it should be understood that a data portion may span one or more blocks. The block ID(s) for each data portion may be associated with a record of the data object and/or the sequence information.

Reader function 328 may process requests to retrieve data objects stored as data portions across distributed ledgers 330A-330N. Each request may be placed by a client device (e.g., client device 302) of a user who also requested the data object to be stored, or by another user using a different client device. In some embodiments, data obfuscation server 316 retains a record of a data object, the sequence information used to divide and store the data object, and the blocks IDs for each data portion of the divided data object; in these embodiments, a user may authenticate with data obfuscation server 316 via conventional or other authentication mechanism in order to ensure that the user is authorized to be provided with the data object. In other embodiments, a user may retain control of the sequence information, which can act as a password for retrieving the data portions, and the request to retrieve a data object may include the necessary sequence information so that reader function 328 can find each data portion in specified blocks of specified distributed ledgers.

Reader function 328 may access the distributed ledgers to which data portions for a data object are stored via API(s) 324. Reader function 328 may utilize the sequence information for the requested data object and recorded block IDs to identify the specific location of each data portion, and can generate a new data object by piecing together the data portions according to the order indicated by the sequence information. Thus, reader function 328 may reconstitute a data object that is identical to the initial data object processed by slicer function 326. The new data object can be provided, as a response to the request for the data object, to the requesting device (e.g., client device 302).

Distributed ledgers 330A-330N may include any computing services implemented by distributed ledger networks and/or other computing entities (e.g., cloud-based processing services, data centers, etc.). In various embodiments, distributed ledgers 330A-330N can include blockchain networks or other distributed storage technologies that employ multiple nodes to collectively store data. Distributed ledgers 330A-330N can provide services including data storage and/or retrieval. Each distributed ledger 330A-330N may include multiple nodes that include logic for coordinating the storage of data and provisioning of stored data; the nodes may collectively perform consensus operations to confirm that data has been stored to one or more blocks. In some embodiments, distributed ledgers 330A-330N correspond to distributed ledger 200, which is depicted and described in further detail with reference to FIG. 2.

Network 332 may include a local area network (LAN), a wide area network (WAN) such as the Internet, or a combination of the two, and includes wired, wireless, or fiber optic connections. In general, network 332 can be any combination of connections and protocols known in the art that will support communications between client device 302, data obfuscation server 316, and/or distributed ledgers 330A-330N via their respective network interfaces in accordance with the described embodiments.

Figure 4:
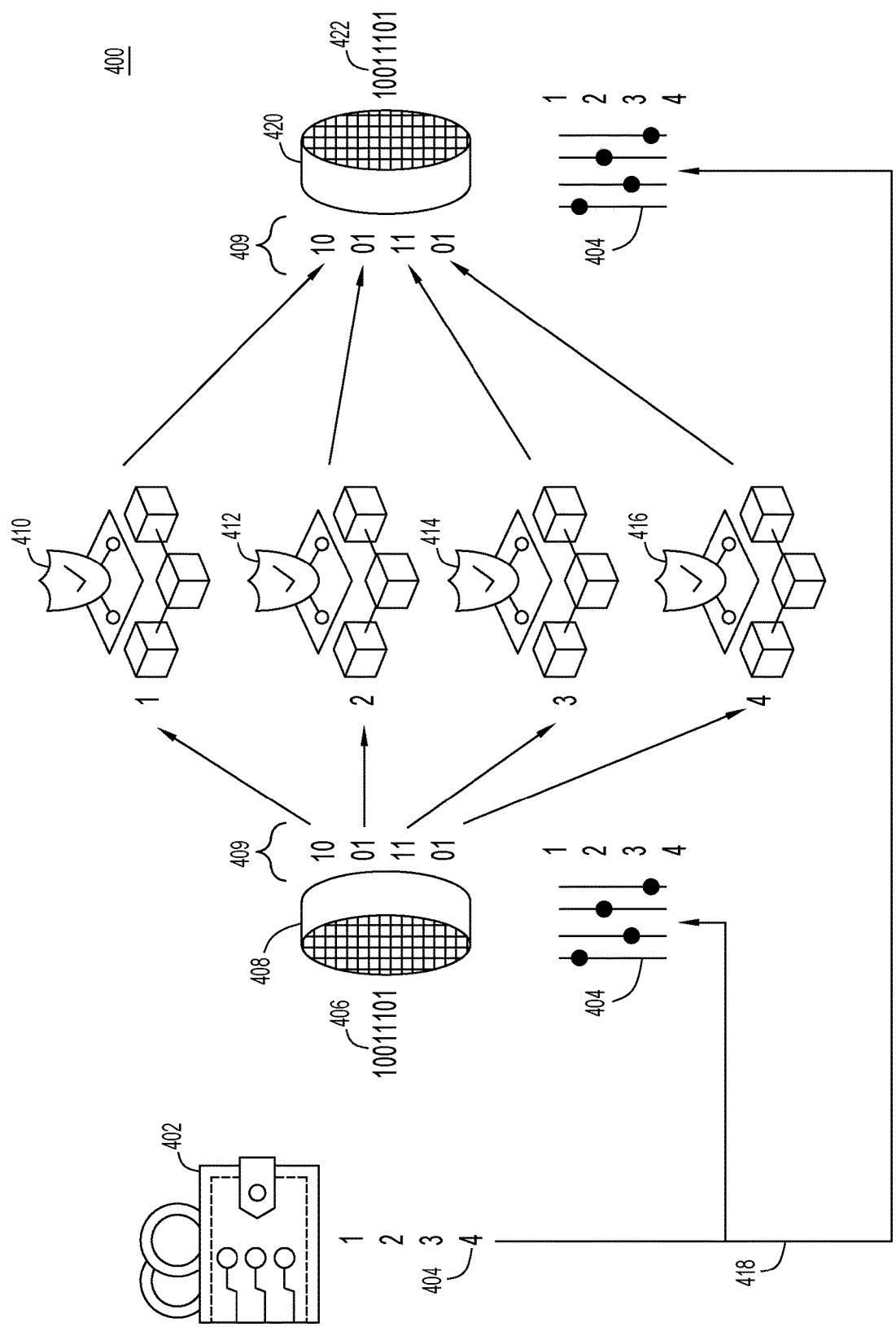
FIG. 4 is a flow diagram of a system for obfuscating and protecting data using Web3 services, according to an example embodiment.

FIG. 4 is a flow diagram of a system 400 for obfuscating and protecting data using Web3 services, according to an example embodiment. As depicted, system 400 includes a wallet 402, sequence information 404, a data object 406, a slicer function 408, data portions 409, distributed ledgers 410, 412, 414, and 416, a reader function 420, and a new data object 422. The various components of system 400 may correspond to those of the same names that are depicted and described with reference to FIG. 3.

Initially, wallet 402 is provided at a client device in order to perform and sign transactions to distributed ledgers. Wallet 402 may include sequence information 404 that can be provided to wallet 402 or generated locally and stored within wallet 402. Sequence information 404 includes instructions for both dividing data objects (e.g., data object 406) and storing the results of dividing (e.g., the resulting data portions) to various distributed ledgers. It should be appreciated that in the depicted example, the length and content of both sequence information 404 and data object 406 have been chosen for purposes of explaining various embodiments and are not to be construed as a limiting example. In particular, while sequence information 404 is depicted as a four-digit string comprising "1234" and data object 406 as a binary comprising "10011101," sequence information 404 and/or data object 406 can be any arbitrary length including binary, alphanumeric characters, and the like.

Sequence information 404 and data object 406 can be provided to slicer function 408 for dividing data object 406 into data portions 409. In the depicted example, the length of sequence information 404, which is four characters (e.g., four segments), indicates that data object 406 should be divided into four data portions 409. Thus, slicer function 408 may divide "10011101" into "10", "01", "11", and "01". Additionally, the value for each character in sequence information 404 may indicate a particular distributed ledger to which each data portion 409 should be stored. In the depicted example, "1" is associated with distributed ledger 410, "2" is associated with distributed ledger 412, "3" is associated with distributed ledger 414, and "4" is associated with distributed ledger 416. Similarly, "1" may correspond to data portion "10", "2" may correspond to data portion "01", "3" may correspond to data portion "11", and "4" may correspond to data portion "01". Thus, slicer function 408 may store data portion "10" to distributed ledger 410, data portion "01" to distributed ledger 412, data portion "11" to distributed ledger 414, and data portion "01" to distributed ledger 416, as shown in system 400. When each data portion 409 is stored to a distributed ledger, the block ID or block IDs to which each data portion 409 is stored may be recorded for subsequent retrieval.

In order to retrieve data corresponding to data object 406, reader function 420 may be provided with sequence information 404 (operation 418), which indicates the number of data portions to retrieve, as well as the identity of each distributed ledger to which each data portion is stored. The sequence information 404 may be transferred from the writer of the data object to the reader function 420 via an out-of-band mechanism in order to ensure a level of security for the sequence information 404 itself. Using the recorded block IDs, reader function 420 can retrieve the data portions 409 and generate a new data object 422 that is identical to data object 406; new data object 422 is generated by piecing together the data portions 409 according to the order indicated by sequence information 404 (e.g., first data portion "10" from the distributed ledger corresponding to character "1" in sequence information 404, which is distributed ledger 410, next data portion "01", and so on). Thus, reader function 420 generates new data object 422, which can be generated upon receiving a request (which may include sequence information 404) for the data object that is provided by a requesting entity. New data object 422 can then be provided to the requesting entity (e.g., a client device of a user).

Figure 5:
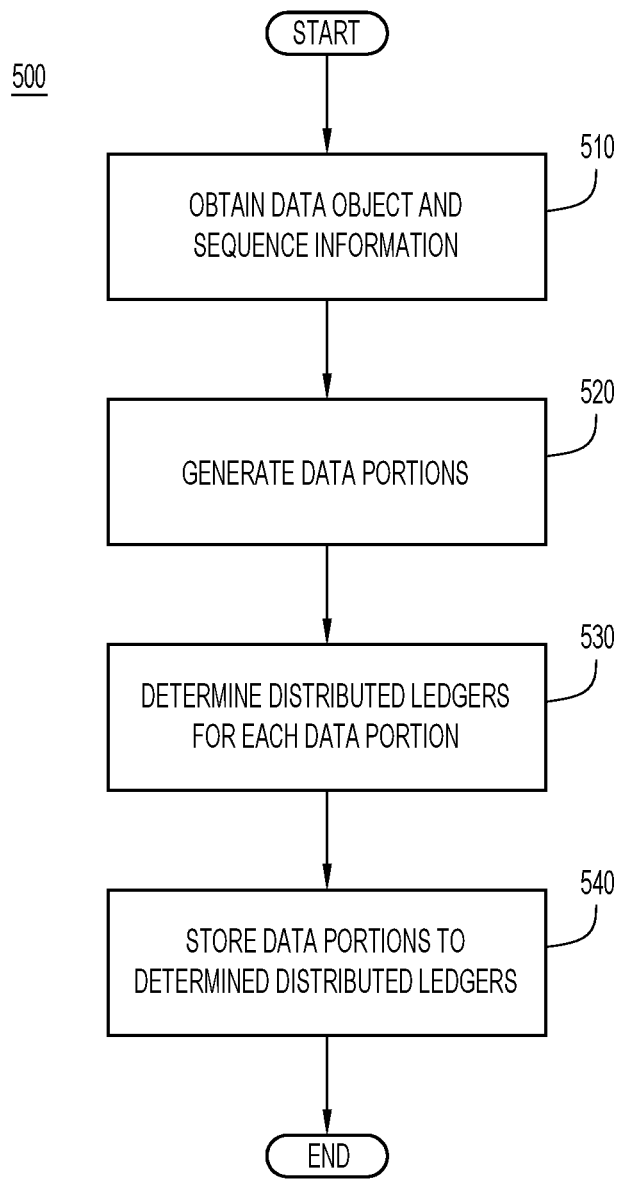
FIG. 5 is a flow chart of a method of obfuscating and storing data using Web3 services, according to an example embodiment.

FIG. 5 is a flow chart of a method 500 of obfuscating and storing data using Web3 services, according to an example embodiment.

A data object and sequence information for storing the data object is obtained at operation 510. The data object may be obtained by a server from a client device, and can include any data file or other data (e.g., a data stream, raw data, time-series data, etc.). Sequence information is also obtained that indicates (i) how many data portions into which a data object should be divided, and (ii) the specific distributed ledger to which each data portion should be stored.

The data portions are generated at operation 520. Based on the sequence information, a number of data portions is determined, and the data portions are generated by splitting up the data object into the number of data portions. Each data portion may be a same data size or a substantially similar data size. In some embodiments, the data portions are generated by splitting a data object, whereas in other embodiments, the data portions are generated based on the data object, which remains intact and can be subsequently stored or deleted.

The distributed ledgers for storing each data portion are determined at operation 530. Using the sequence information, the distributed ledger to which each data portion is to be stored is identified. The distributed ledgers may be unique for each data portion, or some data portions may be stored to a same distributed ledger. In some embodiments, at least three different distributed ledgers are used to store the data portions.

The data portions are stored to the determined distributed ledgers at operation 540. Each distributed ledger may be accessed and provided with a data portion, which can be stored in one or more blocks. Upon confirming storage (e.g., nodes reaching a consensus), the block IDs for each block can be recorded so that the data portions can subsequently be retrieved.

Figure 6:
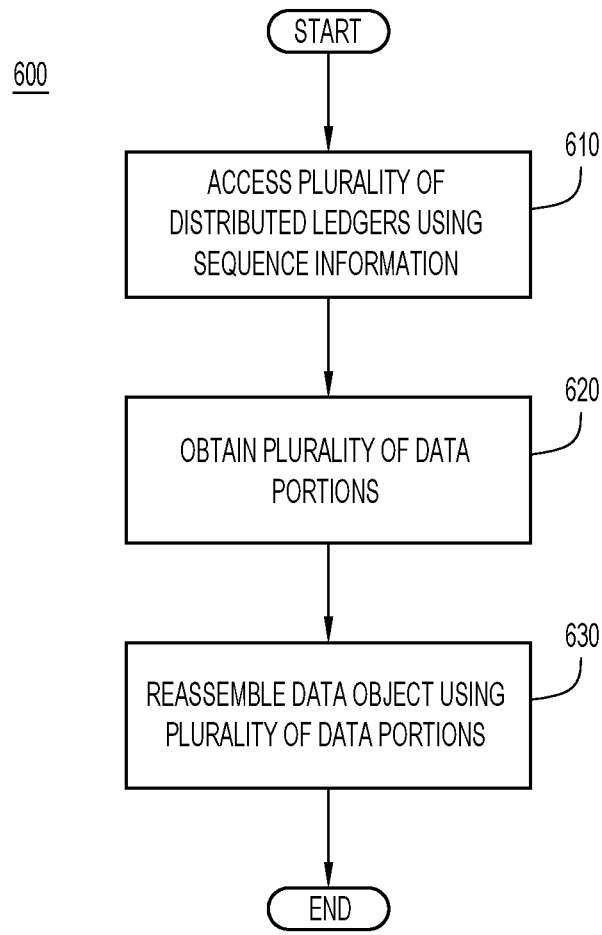
FIG. 6 is a flow chart of a method of accessing data from Web3 services, according to an example embodiment.

FIG. 6 is a flow chart of a method 600 of accessing data from Web3 services, according to an example embodiment.

A plurality of distributed ledgers are accessed using sequence information at operation 610. Initially, a request may be received that indicates sequence information for the data portions. The sequence information may indicate an identity of each distributed ledger, which can be accessed to obtain specific data portions stored in blocks that are indicated by block IDs recorded at the time of storage.

The plurality of data portions are obtained at operation 620. The data portions are accessed from each respective distributed ledger indicated by the sequence information and the block IDs that identify the particular location of the data portions in each distributed ledger. Using the sequence information, the order of the plurality of data portions is determined, and the data portions can be merged (e.g., concatenated, etc.) to form a new data object. Thus, the data object is reassembled using the plurality of data portions at operation 630. The data object may then be sent to a requesting entity that initiated the obtaining of the data object.

Figure 7:
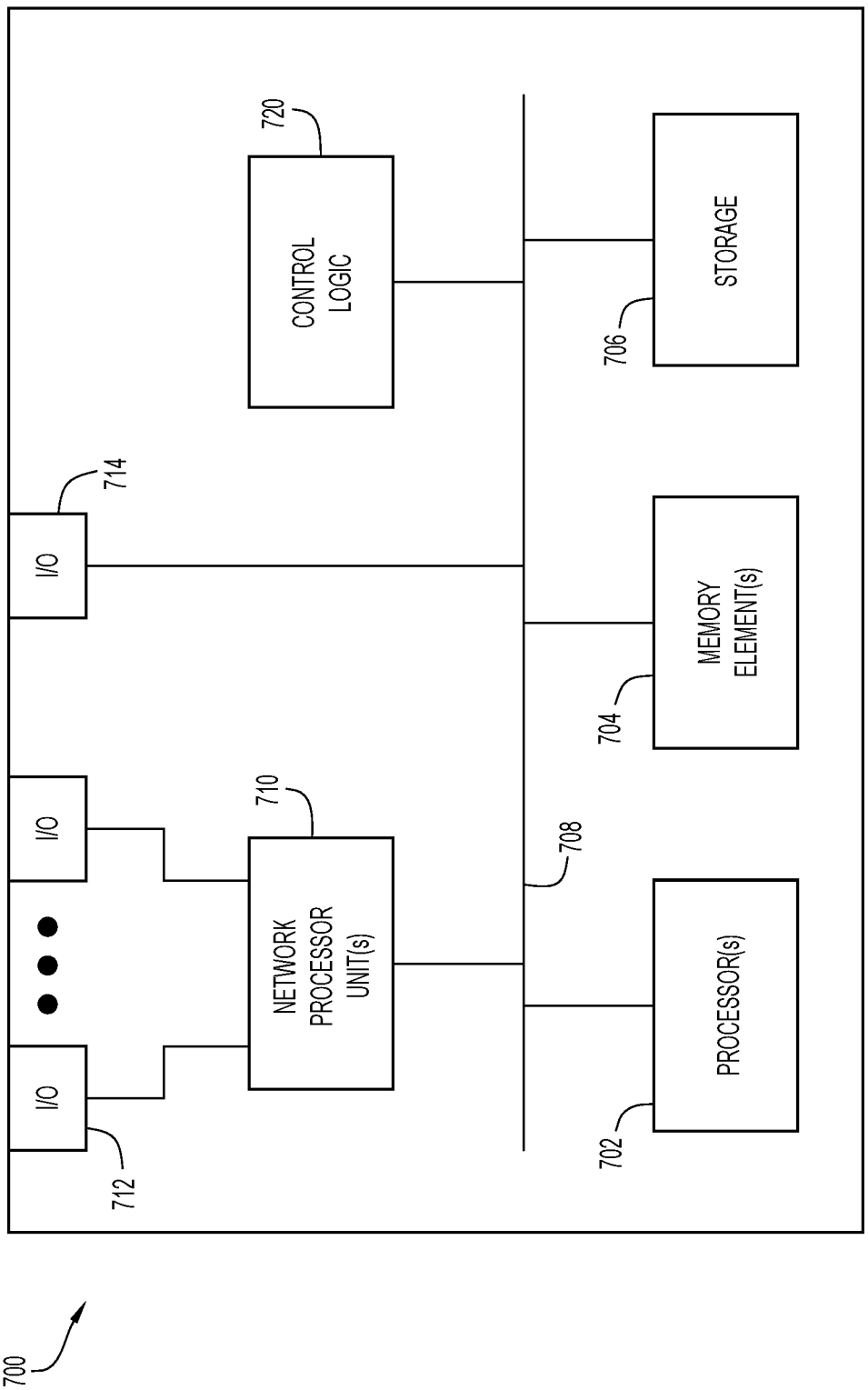
FIG. 7 is a block diagram of a device that may be configured to perform operations to enable prioritizing of network traffic, as presented herein.

Referring now to FIG. 7, FIG. 7 illustrates a hardware block diagram of a computing device 700 that may perform functions associated with operations discussed herein in connection with the techniques depicted in FIGS. 1-6. In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O 714, and 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O 714 allow for input and output of data and/or information with other entities that may be connected to computing device 700. For example, I/O 714 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

In some aspects, the techniques described herein relate to a method including: obtaining a data object including data for storing to a plurality of distributed ledgers; obtaining sequence information indicating a number of a plurality of data portions into which the data object is divided, and instructions for storing the plurality of data portions to the plurality of distributed ledgers; generating the plurality of data portions based on dividing the data object according to the number; determining the plurality of distributed ledgers to store the plurality of data portions based on the instructions indicated by the sequence information; and storing the plurality of data portions across the plurality of distributed ledgers by accessing the plurality of distributed ledgers, wherein each data portion is stored to a particular distributed ledger of the plurality of distributed ledgers according to the instructions indicated by the sequence information.

In some aspects, the techniques described herein relate to a method, further including: obtaining a request, from a requesting device, for the data object; obtaining, from the plurality of distributed ledgers, the plurality of data portions based on the sequence information to retrieve the plurality of data portions; and generating a new data object corresponding to the data object by combining the plurality of data portions according to an order indicated by the sequence information.

In some aspects, the techniques described herein relate to a method, further including: providing the new data object to the requesting device.

In some aspects, the techniques described herein relate to a method, wherein the plurality of distributed ledgers includes at least three distributed ledgers across which the data object is securely stored.

In some aspects, the techniques described herein relate to a method, further including obtaining a different sequence information after a predetermined amount of time.

In some aspects, the techniques described herein relate to a method, wherein dividing the data object includes generating each data portion of the plurality of data portions to provide data portions that are substantially a same data size.

In some aspects, the techniques described herein relate to a method, further including: providing the sequence information to a digital wallet for storage.

In some aspects, the techniques described herein relate to a method, wherein the data object includes one or more of: image data, text data, video data, and audio data.

In some aspects, the techniques described herein relate to a method, further including: generating the sequence information based on a predetermined number that indicates the number of the plurality of data portions.

In some aspects, the techniques described herein relate to a method, wherein a length of the sequence information indicates the number of the plurality of data portions.

In some aspects, the techniques described herein relate to a method, wherein obtaining the sequence information includes obtaining the sequence information from a digital wallet of a client device.

In some aspects, the techniques described herein relate to a method, wherein the sequence information includes a plurality of data segments, and wherein each data segment indicates the particular distributed ledger for storing a particular data portion.

In some aspects, the techniques described herein relate to a computer system including: one or more computer processors; one or more computer readable storage media; and program instructions stored on the one or more computer readable storage media for execution by at least one of the one or more computer processors, the program instructions including instructions to: obtain a data object including data for storing to a plurality of distributed ledgers; obtain sequence information indicating a number of a plurality of data portions into which the data object is divided, and instructions for storing the plurality of data portions to the plurality of distributed ledgers; generate the plurality of data portions based on dividing the data object according to the number; determine the plurality of distributed ledgers to store the plurality of data portions based on the instructions indicated by the sequence information; and store the plurality of data portions across the plurality of distributed ledgers by accessing the plurality of distributed ledgers, wherein each data portion is stored to a particular distributed ledger of the plurality of distributed ledgers according to the instructions indicated by the sequence information.

In some aspects, the techniques described herein relate to a computer system, wherein the program instructions further include instructions to: obtain a request, from a requesting device, for the data object; obtain, from the plurality of distributed ledgers, the plurality of data portions based on the sequence information to retrieve the plurality of data portions; and generate a new data object corresponding to the data object by combining the plurality of data portions according to an order indicated by the sequence information.

In some aspects, the techniques described herein relate to a computer system, further including: providing the new data object to the requesting device.

In some aspects, the techniques described herein relate to a computer system, wherein a length of the sequence information indicates the number of the plurality of data portions.

In some aspects, the techniques described herein relate to one or more non-transitory computer readable storage media having program instructions embodied therewith, the program instructions executable by a computer to cause the computer to perform operations including: obtain a data object including data for storing to a plurality of distributed ledgers; obtain sequence information indicating a number of a plurality of data portions into which the data object is divided, and instructions for storing the plurality of data portions to the plurality of distributed ledgers; generate the plurality of data portions based on dividing the data object according to the number; determine the plurality of distributed ledgers to store the plurality of data portions based on the instructions indicated by the sequence information; and store the plurality of data portions across the plurality of distributed ledgers by accessing the plurality of distributed ledgers, wherein each data portion is stored to a particular distributed ledger of the plurality of distributed ledgers according to the instructions indicated by the sequence information.

In some aspects, the techniques described herein relate to one or more non-transitory computer readable storage media, wherein the program instructions further cause the computer to perform operations including: obtain a request, from a requesting device, for the data object; obtain, from the plurality of distributed ledgers, the plurality of data portions based on the sequence information to retrieve the plurality of data portions; and generate a new data object corresponding to the data object by combining the plurality of data portions according to an order indicated by the sequence information.

In some aspects, the techniques described herein relate to one or more non-transitory computer readable storage media, wherein the program instructions further cause the computer to perform operations including: providing the new data object to the requesting device.

In some aspects, the techniques described herein relate to one or more non-transitory computer readable storage media, wherein a length of the sequence information indicates the number of the plurality of data portions.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining a data object comprising data for storing to a plurality of distributed ledgers;
obtaining sequence information indicating a number of a plurality of data portions into which the data object is divided, and instructions for storing the plurality of data portions to the plurality of distributed ledgers;
generating the plurality of data portions based on dividing the data object according to the number;
determining the plurality of distributed ledgers to store the plurality of data portions based on the instructions indicated by the sequence information; and
storing the plurality of data portions across the plurality of distributed ledgers by accessing the plurality of distributed ledgers, wherein each data portion is stored to a particular distributed ledger of the plurality of distributed ledgers according to the instructions indicated by the sequence information.

2. The method of claim 1, further comprising:
obtaining a request, from a requesting device, for the data object;
obtaining, from the plurality of distributed ledgers, the plurality of data portions based on the sequence information to retrieve the plurality of data portions; and
generating a new data object corresponding to the data object by combining the plurality of data portions according to an order indicated by the sequence information.

3. The method of claim 2, further comprising:
providing the new data object to the requesting device.

4. The method of claim 1, wherein the plurality of distributed ledgers comprises at least three distributed ledgers across which the data object is securely stored.

5. The method of claim 1, further comprising:
obtaining a different sequence information after a predetermined amount of time.

6. The method of claim 1, wherein dividing the data object comprises generating each data portion of the plurality of data portions to provide data portions that are substantially a same data size.

7. The method of claim 1, further comprising:
providing the sequence information to a digital wallet for storage.

8. The method of claim 1, wherein the data object includes one or more of: image data, text data, video data, and audio data.

9. The method of claim 1, further comprising:
generating the sequence information based on a predetermined number that indicates the number of the plurality of data portions.

10. The method of claim 1, wherein a length of the sequence information indicates the number of the plurality of data portions.

11. The method of claim 1, wherein obtaining the sequence information comprises obtaining the sequence information from a digital wallet of a client device.

12. The method of claim 1, wherein the sequence information comprises a plurality of data segments, and wherein each data segment indicates the particular distributed ledger for storing a particular data portion.

13. A computer system comprising:
one or more computer processors;
one or more computer readable storage media; and
program instructions stored on the one or more computer readable storage media for execution by at least one of the one or more computer processors, the program instructions comprising instructions to:
obtain a data object comprising data for storing to a plurality of distributed ledgers;
obtain sequence information indicating a number of a plurality of data portions into which the data object is divided, and instructions for storing the plurality of data portions to the plurality of distributed ledgers;
generate the plurality of data portions based on dividing the data object according to the number;
determine the plurality of distributed ledgers to store the plurality of data portions based on the instructions indicated by the sequence information; and
store the plurality of data portions across the plurality of distributed ledgers by accessing the plurality of distributed ledgers, wherein each data portion is stored to a particular distributed ledger of the plurality of distributed ledgers according to the instructions indicated by the sequence information.

14. The computer system of claim 13, wherein the program instructions further comprise instructions to:
obtain a request, from a requesting device, for the data object;
obtain, from the plurality of distributed ledgers, the plurality of data portions based on the sequence information to retrieve the plurality of data portions; and
generate a new data object corresponding to the data object by combining the plurality of data portions according to an order indicated by the sequence information.

15. The computer system of claim 14, further comprising:
providing the new data object to the requesting device.

16. The computer system of claim 13, wherein a length of the sequence information indicates the number of the plurality of data portions.

17. One or more non-transitory computer readable storage media having program instructions embodied therewith, the program instructions executable by a computer to cause the computer to perform operations including:
obtain a data object comprising data for storing to a plurality of distributed ledgers;
obtain sequence information indicating a number of a plurality of data portions into which the data object is divided, and instructions for storing the plurality of data portions to the plurality of distributed ledgers;
generate the plurality of data portions based on dividing the data object according to the number;
determine the plurality of distributed ledgers to store the plurality of data portions based on the instructions indicated by the sequence information; and
store the plurality of data portions across the plurality of distributed ledgers by accessing the plurality of distributed ledgers, wherein each data portion is stored to a particular distributed ledger of the plurality of distributed ledgers according to the instructions indicated by the sequence information.

18. The one or more non-transitory computer readable storage media of claim 17, wherein the program instructions further cause the computer to perform operations including:
obtain a request, from a requesting device, for the data object;
obtain, from the plurality of distributed ledgers, the plurality of data portions based on the sequence information to retrieve the plurality of data portions; and generate a new data object corresponding to the data object by combining the plurality of data portions according to an order indicated by the sequence information.

19. The one or more non-transitory computer readable storage media of claim 18, wherein the program instructions further cause the computer to perform operations including:
providing the new data object to the requesting device.

20. The one or more non-transitory computer readable storage media of claim 17, wherein a length of the sequence information indicates the number of the plurality of data portions.

* * * * *